United States Patent
Kida et al.

(10) Patent No.: US 9,162,471 B2
(45) Date of Patent: Oct. 20, 2015

(54) ULTRAVIOLET RAY CURABLE INK JET RECORDING APPARATUS AND INK JET RECORDING METHOD

(71) Applicant: Seiko Epson Corporation, Tokyo (JP)

(72) Inventors: Hiroaki Kida, Shiojiri (JP); Masaaki Ando, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/225,076

(22) Filed: Mar. 25, 2014

(65) Prior Publication Data
US 2014/0285587 A1    Sep. 25, 2014

(30) Foreign Application Priority Data

Mar. 25, 2013 (JP) ................ 2013-061558
May 13, 2013 (JP) ................ 2013-100996

(51) Int. Cl.
*B41J 2/175* (2006.01)
*B41J 2/19* (2006.01)
*B41J 2/18* (2006.01)
*C09D 11/30* (2014.01)

(52) U.S. Cl.
CPC ........... *B41J 2/17596* (2013.01); *B41J 2/18* (2013.01); *B41J 2/19* (2013.01); *C09D 11/30* (2013.01)

(58) Field of Classification Search
CPC ............ B41J 2/18; B41J 2/19; B41J 2202/12
See application file for complete search history.

(56) References Cited

U.S. PATENT DOCUMENTS

| 5,466,131 A * | 11/1995 | Altham et al. ............. 417/420 |
| 2008/0079792 A1* | 4/2008 | Hirato ............. 347/92 |
| 2009/0167829 A1* | 7/2009 | Iijima ............. 347/92 |
| 2012/0083545 A1* | 4/2012 | Kida et al. ............. 522/26 |

FOREIGN PATENT DOCUMENTS

JP    2012-020559 A    2/2012

\* cited by examiner

*Primary Examiner* — Geoffrey Mruk
(74) *Attorney, Agent, or Firm* — Nutter McClennen & Fish LLP; John J. Penny, Jr.; Joshua I. Rudawitz

(57) ABSTRACT

An ultraviolet ray curable ink jet recording apparatus includes a head for discharging an ink composition for an ultraviolet ray curable ink jet recording, an ink flow path supplying the ink composition for the ultraviolet ray curable ink jet recording to the head, and a gear pump for circulating the ink composition for the ultraviolet ray curable ink jet recording to the ink flow path, in which the ink composition for the ultraviolet ray curable ink jet recording contains a hindered amine compound.

10 Claims, 3 Drawing Sheets

ULTRAVIOLET RAY CURABLE INK JET RECORDING APPARATUS AND INK JET RECORDING METHOD

BACKGROUND

1. Technical Field

The present invention relates to an ultraviolet ray curable ink jet recording apparatus and an ink jet recording method using the same.

2. Related Art

In the related art, as a fluid flow apparatus, a gear pump is known. In the gear pump used in an ink jet recording apparatus, by rotating one pair of gears housed in a pump chamber (fluid chamber) in an engaged state, ink sucked from a suction opening is discharged from a discharge opening, thereby making the ink flow. In such a gear pump, if the ink enters a place with a high resistance with respect to a fluid, for example, a gap between an axis (rotating body) and a bearing (support portion), there is a concern that the ink is cured and thus rotation of the axis is hindered. Therefore, it is conceivable to increase a fluidity of the ink entering the gap by increasing the gap between the axis and the bearing. However, since a center of the axis is not stable in the case where the gap is increased, there is a problem in which the axis is difficult to smoothly rotate (shaky).

Accordingly, JP-A-2012-20559 discloses a fluid flow apparatus which can suppress shakiness against a support portion of a rotating body which rotates to make a fluid, which is subject to a polymerization reaction, flow and excellently rotates the rotating body, and is provided with the fluid chamber for making a fluid having a polymerization inhibition property due to oxygen while being cured by polymerization reaction flow, the rotating body which is rotatably supported around the axis of a support portion provided in the fluid chamber, and a driving means for rotationally driving the rotating body, in which the support portion is configured with a material having gas permeability, and is designed to separate the inside and the outside of the fluid chamber. According to this configuration, since the support portion which separates the inside and the outside of the fluid chamber is configured with a material having gas permeability, in the case where the gas which penetrates the support portion from the outside of the fluid chamber includes oxygen, the curing of the fluid in the fluid chamber can be suppressed by the oxygen.

However, in the case where an ink composition for the ultraviolet ray curable ink jet recording is transported using the gear pump, since even if oxygen flows into the gear pump, the oxygen flowed into is consumed by the influence of the material of the gear pump and heat generated, and thus, polymerization of the ink composition is not inhibited, and there is a case where the rotating body and the support portion in the gear pump are fixed by the polymerization product. When such fixation occurs, there is a problem in which durability of the gear pump is deteriorated.

In contrast, it is also conceivable that the ink composition for the ultraviolet ray curable ink jet recording is transported using a tube pump or a diaphragm pump. In such a method, the ink composition is unlikely to be fixed. However, there is a problem in the durability in which the tube pump or the tube is likely to be damaged. In addition, since it is difficult for the diaphragm pump to transport a fluid at a constant flow rate, there is a problem in discharging amount stability.

SUMMARY

An advantage of some aspects of the invention is to provide an ultraviolet ray curable ink jet recording apparatus having excellent durability and discharging amount stability, and an ink jet recording method using the same.

The present inventors repeated thorough studies. As a result, the present inventors found that the above objects may be achieved by transporting an ink composition for an ultraviolet ray curable ink jet recording having hindered amine, thereby completing the invention.

That is, the invention is as follows.

[1] An ultraviolet ray curable ink jet recording apparatus, including a head for discharging an ink composition for an ultraviolet ray curable ink jet recording, an ink flow path supplying the ink composition for the ultraviolet ray curable ink jet recording to the head, and a gear pump for circulating the ink composition for the ultraviolet ray curable ink jet recording to the ink flow path, in which the ink composition for the ultraviolet ray curable ink jet recording contains a hindered amine compound.

[2] The ultraviolet ray curable ink jet recording apparatus described in [1], in which the ink composition for the ultraviolet ray curable ink jet recording contains the hindered amine compound in the range of 0.05% by mass to 0.5% by mass.

[3] The ultraviolet ray curable ink jet recording apparatus described in [1] or [2], in which the hindered amine compound includes a compound having a 2,2,6,6-tetramethylpiperidine-N-oxyl skeleton.

[4] The ultraviolet ray curable ink jet recording apparatus described in any one of [1] to [3], in which dissolved oxygen content of the ink composition for the ultraviolet ray curable ink jet recording flowing into the gear pump is in the range of 2 ppm to 20 ppm.

[5] The ultraviolet ray curable ink jet recording apparatus described in any one of [1] to [4], in which the gear pump includes at least one material selected from a group consisting of polyphenylene sulfide, polyethylene terephthalate, polybutylene terephthalate and ceramic.

[6] The ultraviolet ray curable ink jet recording apparatus described in any one of [1] to [5], in which a deaeration apparatus is further provided in the ink flow path.

[7] The ultraviolet ray curable ink jet recording apparatus described in [6], in which the ink flow path has an ink circulation path, and the deaeration apparatus and the gear pump are provided in the ink circulation path.

[8] The ultraviolet ray curable ink jet recording apparatus described in any one of [1] to [7], in which the ink composition for the ultraviolet ray curable ink jet recording further contains an acylphosphine oxide-based photopolymerization initiator.

[9] The ultraviolet ray curable ink jet recording apparatus described in any one of [1] to [8], in which a heating apparatus is further provided in the ink flow path.

[10] The ultraviolet ray curable ink jet recording apparatus described in any one of [1] to [9], in which a feed amount of the ink composition for the ultraviolet ray curable ink jet recording of the gear pump is in the range of 50 g/min to 400 g/min.

[11] The ultraviolet ray curable ink jet recording apparatus described in any one of [1] to [10], in which the ink composition for the ultraviolet ray curable ink jet recording further contains tri- or higher multifunctional (meth)acrylate.

[12] An ink jet recording method, in which an ink composition for an ultraviolet ray curable ink jet recording containing a hindered amine compound is circulated to an ink flow path by a gear pump, is supplied to a head, and is discharged from the head, using the ultraviolet ray curable ink jet recording apparatus described in any one of [1] to [11].

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
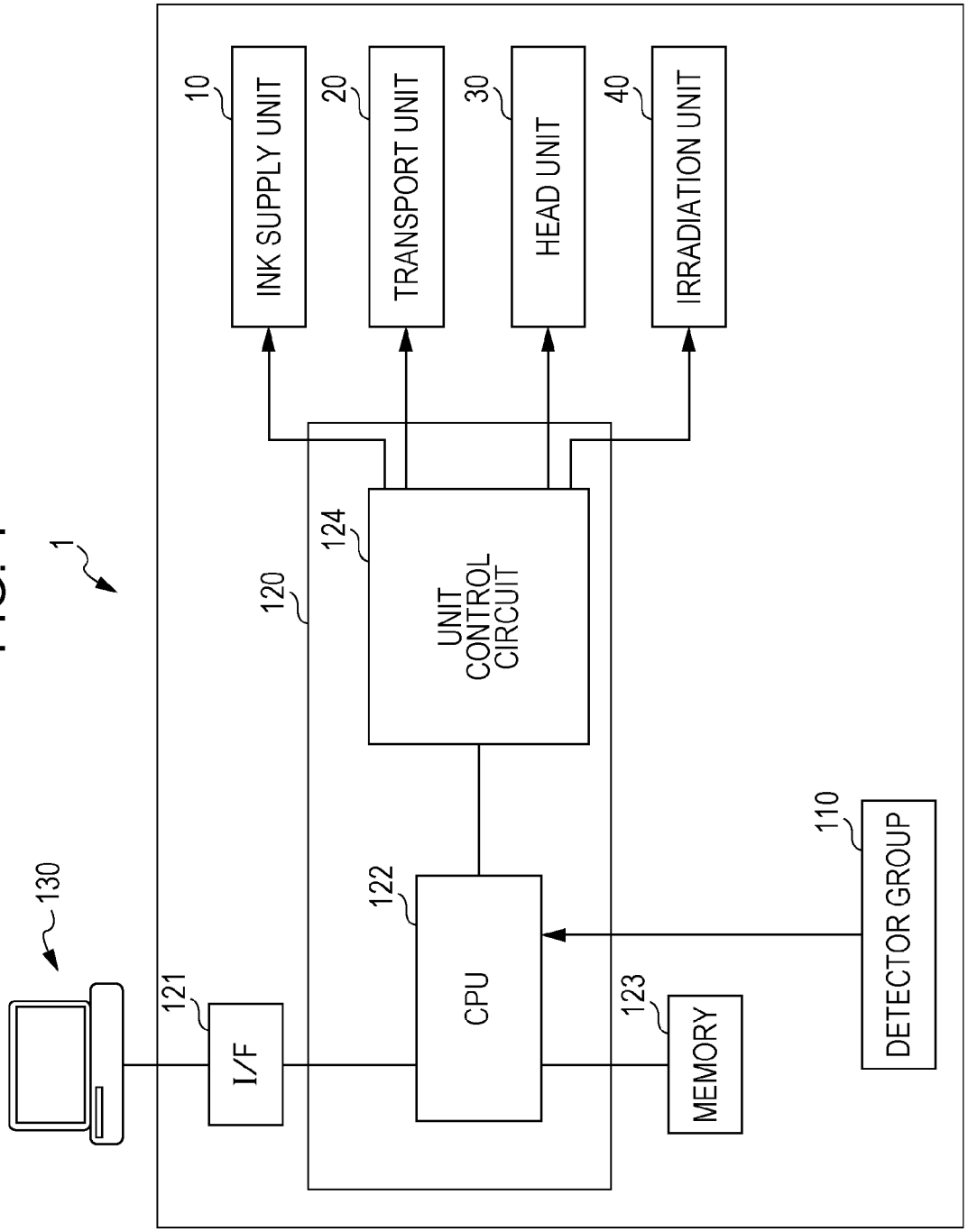
FIG. 1 is a block diagram showing an example of a configuration of an ultraviolet ray curable ink jet recording apparatus of the embodiment.

Hereinafter, an embodiment for carrying out the invention (hereinafter, referred to as "the embodiment") will be described in detail with reference to the drawings as necessary. Further, the invention is not limited thereto, and various modifications are possible without departing from the gist of the invention. Moreover, in the drawings, the same reference numerals are given to the same element, and the overlapping descriptions will not be repeated. In addition, a positional relationship such as upward, downward, leftward and rightward is based on the positional relationship shown in the drawings unless stated otherwise. Moreover, the dimensional ratio of the drawings is not limited to the ratio shown.

Ultraviolet Ray Curable Ink Jet Recording Apparatus

The ultraviolet ray curable ink jet recording apparatus (hereinafter, also simply referred to as "ink jet recording apparatus") of the embodiment has a head for discharging an ink composition for an ultraviolet ray curable ink jet recording (hereinafter, also simply referred to as "ink composition"), an ink flow path supplying the ink composition for the ultraviolet ray curable ink jet recording to the head, and a gear pump for circulating the ink composition for the ultraviolet ray curable ink jet recording to the ink flow path, in which the ink composition for the ultraviolet ray curable ink jet recording contains a hindered amine compound.

Ink Composition for Ultraviolet Ray Curable Ink Jet Recording

The ink composition for the ultraviolet ray curable ink jet recording used in the embodiment contains the hindered amine compound, and can also include each component listed below as necessary. The ink composition for the ultraviolet ray curable ink jet recording circulates in the ink flow path, is supplied to the head, and is discharged from the head, in the above-described ink jet recording apparatus.

Hindered Amine Compound

The ink composition used in the embodiment includes the hindered amine compound. In general, as a dissolved oxygen content of the ultraviolet ray curable ink composition is low, it is difficult to obtain the effect of polymerization (dark reaction) suppression of an ink by oxygen. In addition, when the dissolved oxygen content is low, polymerization inhibitors such as p-methoxyphenol (MEHQ) do not act as the polymerization inhibitor. For this reason, there is a tendency that the ink composition is fixed in the gear pump. However, since the hindered amine compound acts as the polymerization inhibitor even when the dissolved oxygen content is low, it is possible to suppress the fixation of the ink composition in the gear pump even when the dissolved oxygen content is low.

Examples of the hindered amine compounds, which are not limited to the following, include compounds having a 2,2,6,6-tetramethylpiperidine-N-oxyl skeleton, compounds having a 2,2,6,6-tetramethylpiperidine skeleton, compounds having a 2,2,6,6-tetramethylpiperidine-N-alkyl skeleton and compounds having a 2,2,6,6-tetramethylpiperidine-N-acyl skeleton. By using such a hindered amine compound, durability of the ink jet recording apparatus is more excellent.

Examples of commercially available hindered amine compounds include ADK STAB LA-7RD (2,2,6,6-tetramethyl-4-hydroxypiperidine-1-oxyl) (product name, manufactured by Adeka Co., Ltd.), IRGASTAB UV10 (4,4'-[1,10-dioxo-1,10-decanediyl)bis(oxy)]bis[2,2,6,6-tetramethyl]-1-piperidinyloxy) (CAS. 2516-92-9) and TINUVIN 123 (4-hydroxy-2,2,6,6-tetramethylpiperidine-N-oxyl) (hereinbefore, product names, manufactured by BASF Corp.), FA-711HM and FA-712HM (2,2,6,6-tetramethylpiperidinyl methacrylate, product names, manufactured by Hitachi Chemical Company, Ltd.), TINUVIN 111FDL, TINUVIN 144, TINUVIN 152, TINUVIN 292, TINUVIN 765, TINUVIN 770DF, TINUVIN 5100, SANOL LS-2626, CHIMASSORB 119FL, CHIMASSORB 2020FDL, CHIMASSORB 944FDL and TINUVIN 622LD (hereinbefore, product names, manufactured by BASF Corp.), and LA-52, LA-57, LA-62, LA-63P, LA-68LD, LA-77Y, LA-77G, LA-81, LA-82 (1,2,2,6,6-pentamethyl-4-piperidyl methacrylate) and LA-87 (hereinbefore, product names, manufactured by Adeka Co., Ltd.).

Moreover, among the above-described commercially available products, LA-82 is a compound having a 2,2,6,6-tetramethylpiperidine-N-methyl skeleton, and ADK STAB LA-7RD and IRGASTAB UV10 are compounds having the 2,2,6,6-tetramethylpiperidine-N-oxyl skeleton. Among these, the compound having the 2,2,6,6-tetramethylpiperidine-N-oxyl skeleton is preferable since an excellent curing property of the compound is maintained, and a storage stability and durability of an ink can be further improved.

Specific examples of the compounds having the 2,2,6,6-tetramethylpiperidine-N-oxyl skeleton, which are not limited to the following, include 2,2,6,6-tetramethyl-4-hydroxypiperidine-1-oxyl, 4,4'-[1,10-dioxo-1,10-decanediyl)bis(oxy)]bis[2,2,6,6-tetramethyl]-1-piperidinyloxy, 4-hydroxy-2,2,6,6-tetramethylpiperidine-N-oxyl, bis(1-oxyl-2,2,6,6-tetramethylpiperidine-4-yl)sebacate, and bis(2,2,6,6-tetramethyl-1-(octyloxy)-4-piperidinyl)sebacate.

The hindered amine compound may be used alone or two or more kinds may be used in combination.

The content of the hindered amine compound is preferably in the range of 0.05% by mass to 0.5% by mass, more preferably in the range of 0.05% by mass to 0.4% by mass, still more preferably in the range of 0.05% by mass to 0.2% by mass, and particularly preferably in the range of 0.06% by mass to 0.2% by mass with respect to the total mass (100% by mass) of the ink composition. When the content is 0.05% by mass or more, fixation of the ink composition in the gear pump can be further suppressed, whereby the durability becomes more excellent. In addition, when the content is 0.5% by mass or less, solubility is more excellent.

Other Polymerization Inhibitor

The ink composition of the embodiment may further includes compounds other than the hindered amine compound, as the polymerization inhibitor. Examples of other polymerization inhibitors, which are not limited to the following, include p-methoxyphenol (hydroquinone monomethyl ether: MEHQ), hydroquinone, cresol, t-butylcatechol, 3,5-di-t-butyl-4-hydroxy toluene, 2,2'-methylene bis(4-methyl-6-t-butylphenol), 2,2'-methylene bis(4-ethyl-6-butylphenol) and 4,4'-thio bis(3-methyl-6-t-butylphenol).

The other polymerization inhibitor may be used alone or two or more kinds may be used in combination. The content of the other polymerization inhibitor is determined by the relationship with the content of other component, and it is not particularly limited.

Dissolved Oxygen Content

The dissolved oxygen content in the ink composition flowed into the gear pump in the embodiment is preferably in the range of 2 ppm to 20 ppm, more preferably in the range of 5 ppm to 20 ppm, and still more preferably in the range of 10 ppm to 20 ppm. When the dissolved oxygen content is in the above range, the fixation of the ink composition in the gear pump can be further suppressed, whereby the durability of the ink jet recording apparatus becomes more excellent. Moreover, the dissolved oxygen content in the specification can be measured by known methods in the related art. The values obtained by the measurement method performed in the examples described below are adopted. Examples of deaeration treatments in which the dissolved oxygen content is set to a predetermined value, which are not particularly limited, include a method using a deaeration apparatus such as a reduced pressure deaerator, and bubbling of an inert gas. Moreover, the dissolved oxygen content in the ink composition flowed into the gear pump can be determined by a method described in the examples.

Photopolymerization Initiator

The ink composition used in the embodiment can include a photopolymerization initiator. The photopolymerization initiator is used so as to cure an ink present on a surface of a recording medium and so as to form a print, by virtue of a photopolymerization by irradiation with ultraviolet rays. The ink jet recording apparatus according to the embodiment is excellent in safety, and can reduce the cost of a light source by using the ultraviolet ray among radiation rays. The photopolymerization initiator is not limited as long as it produces active species such as a radical or a cation, and initiates a polymerization of a polymerizable compound by energy of the light (ultraviolet ray), and a photo-radical polymerization initiator or a photo-cationic polymerization initiator can be used. Among these, the photo-radical polymerization initiator is preferably used. When using the photo-radical polymerization initiator, there is a tendency that the polymerization is likely to proceed in the case where the amount of oxygen is small. For this reason, there is a tendency that the ink composition is thickened in the gear pump in which oxygen is likely to become a deficient state, and the ultraviolet ray curable ink jet recording apparatus of the embodiment is particularly useful.

Examples of the above-described photo-radical polymerization initiators, which are not particularly limited, include an aromatic ketone, an acylphosphine oxide compound, a thioxanthone compound, an aromatic onium salt compound, an organic peroxide, a thio compound (thiophenyl group-containing compound), an alpha-aminoalkylphenone compound, a hexaarylbiimidazole compound, a ketoxime ester compound, a borate compound, an azinium compound, a metallocene compound, an active ester compound, a compound having a carbon-halogen bond and an alkyl amine compound.

Among these, the acylphosphine oxide-based photopolymerization initiator (acylphosphine oxide compound) and the thioxanthone-based photopolymerization initiator (thioxanthone compound) are preferable, and the acylphosphine oxide-based photopolymerization initiator is more preferable. By using the acylphosphine oxide-based photopolymerization initiator and the thioxanthone-based photopolymerization initiator, particularly, the acylphosphine oxide-based photopolymerization initiator, a curing process by UV-LED becomes more excellent, and the curing property of the ink composition is further improved. In addition, since when using these photo-radical polymerization initiators, there are tendencies for the ink composition to be thickened again in the gear pump, and for discharging stability to be likely to deteriorate in the case where the dissolved oxygen content is high, this is disadvantageous in terms of the durability since it is necessary to reduce the dissolved oxygen content, and thus, the ultraviolet ray curable ink jet recording apparatus of the embodiment is particularly useful.

Specific examples of the acylphosphine oxide-based photopolymerization initiators, which are not particularly limited, include bis(2,4,6-trimethylbenzoyl)-phenylphosphine oxide, 2,4,6-trimethylbenzoyl-diphenyl-phosphine oxide and bis-(2,6-dimethoxybenzoyl)-2,4,4-trimethylpentylphosphine oxide.

Specific examples of commercially available acylphosphine oxide-based photopolymerization initiators, which are not particularly limited include IRGACURE 819 (bis(2,4,6-trimethylbenzoyl)-phenylphosphine oxide) and DAROCUR TPO (2,4,6-trimethylbenzoyl-diphenyl-phosphine oxide).

The content of acylphosphine oxide-based photopolymerization initiator is preferably in the range of 2% by mass to 15% by mass, more preferably in the range of 5% by mass to 13% by mass, and still more preferably in the range of 7% by mass to 13% by mass with respect to the total mass (100% by mass) of the ink composition. When the content is 2% by mass or more, there is a tendency that the curing property of an ink is further improved. In addition, when the content is 13% by mass or less, there is a tendency that the discharging stability is further improved.

In addition, specific examples of the thioxanthone-based photopolymerization initiators, which are not particularly limited, preferably include one or more kinds selected from a group consisting of thioxanthone, diethylthioxanthone, isopropylthioxanthone and chlorothioxantone. Moreover, as the diethylthioxanthone, 2,4-diethylthioxanthone is preferable, as the isopropylthioxanthone, 2-isopropylthioxanthone is preferable, and as the chlorothioxantone, 2-chlorothioxantone is preferable, but they are not particularly limited. When the ink composition includes the thioxanthone-based photopolymerization initiator, the curing property, the storage stability and the discharging stability tend to be more excellent. Among these, the thioxanthone-based photopolymerization initiator including the diethylthioxanthone is preferable. By including the diethylthioxanthone, there is a tendency that ultraviolet light (UV light) of a wide range can convert to active species in a more efficient manner.

Specific examples of commercially available thioxanthone-based photopolymerization initiators, which are not particularly limited, include Speedcure DETX (2,4-diethylthioxanthone), Speedcure ITX (2-Isopropylthioxanthone) (hereinbefore, manufactured by Lambson, Ltd.), and KAYACURE DETX-S (2,4-diethylthioxanthone) (manufactured by Nippon Kayaku Co., Ltd.).

The content of the thioxanthone-based photopolymerization initiator is preferably in the range of 0.5% by mass to 4% by mass, and more preferably in the range of 1% by mass to 4% by mass with respect to the total mass (100% by mass) of the ink composition. When the content is 0.5% by mass or more, there is a tendency that the curing property of an ink is further improved. In addition, when the content is 4% by mass or less, the discharging stability is more excellent.

Examples of other photo-radical polymerization initiators, which are not particularly limited, include acetophenone, acetophenone benzyl ketal, 1-hydroxy cyclohexyl phenyl ketone, 2,2-dimethoxy-2-phenylacetophenone, xanthone, fluorenone, benzaldehyde, fluorene, anthraquinone, triphenylamine, carbazole, 3-methyl acetophenone, 4-chlorobenzophenone, 4,4'-dimethoxybenzophenone, 4,4'-diaminobenzophenone, Michler's ketone, benzoin propyl ether, benzoin ethyl ether, benzyldimethyl ketal, 1-(4-isopropylphenyl)-2-hydroxy-2-methylpropane-1-one, 2-hydroxy-2-methyl-1-phenylpropane-1-one and 2-methyl-1-[4-(methylthio)phenyl]-2-morpholinopropan-1-one.

Examples of commercially available photo-radical polymerization initiators, which are not particularly limited, include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propan-1-one}, IRGACURE 907 (2-methyl-1-(4-methylthiophenyl)-2-morpholinopropan-1-one), IRGACURE 369 (2-benzyl-2-dimethylamono-1-(4-morpholinophenyl)-butanone-1), IRGACURE 379 (2-(dimethylamino)-2-[(4-methylphenyl)methyl]-1-[4-(4-morpholinyl)phenyl]-1-butanone), IRGACURE 784 (Bis(eta5-2,4-cylcopentadien-1-yl)-bis(2,6-difluoro-3-(1H-pyrrol-1-yl)-phenyl) titanium), IRGACURE OXE 01 (1,2-octanedione 1-[4-(phenylthio)-2-(O-benzoyl oxime)]), IRGACURE OXE 02 (ethanone, 1-[9-ethyl-6-(2-methylbenzoyl)-9H-carbazol-3-yl]-1-(O-acetyl oxime)), IRGACURE 754 (a mixture of oxyphenyl acetic acid 2-[2-oxo-2-phenylacetoxyethoxy]ethyl ester and oxyphenyl acetic acid 2-[2-hydroxyethoxy]ethyl ester) (hereinbefore, manufactured by BASF Corp.), Speedcure TPO (manufactured by Lambson Ltd.), Lucirin TPO, LR8893, LR8970 (hereinbefore, manufactured by BASF Corp.) and Ubecryl P36 (UCB Chemicals).

Specific examples of the cationic polymerization initiators, which are not particularly limited, include a sulfonium salt, an iodonium salt and the like. Specific examples of commercially available cationic polymerization initiators, which are not particularly limited, include IRGACURE 250, IRGACURE 270 and the like.

The photopolymerization initiator may be used alone or two or more kinds may be used in combination.

The content of other photopolymerization initiators is preferably in the range of 5% by mass to 20% by mass with respect to the total mass (100% by mass) of the ink composition. When the content is in the range, it is possible to sufficiently exert an ultraviolet-curing speed and avoid leaving undissolved residues of the photopolymerization initiator and coloring due to the photopolymerization initiator.

Polymerizable Compound

The ink composition may further include a polymerizable compound. The polymerizable compound is polymerized during light radiation, alone or by the action of the photopolymerization initiator, and thus, the printed ink composition can be cured. Specific examples of the polymerizable compounds, which are not particularly limited, include monofunctional, bifunctional and tri- or higher multifunctional monomers and oligomers known in the related art. The polymerizable compound may be used alone or two or more kinds may be used in combination. Hereinafter, these polymerizable compounds will be exemplified.

Specific examples of the monofunctional, bifunctional and tri- or higher multifunctional monomers, which are not particularly limited, include unsaturated carboxylic acids such as (meth)acrylic acid, itaconic acid, crotonic acid, isocrotonic acid and maleic acid; salts of the unsaturated carboxylic acids; ester, urethane, amide and anhydride of the unsaturated carboxylic acids; acrylonitrile, styrene, various unsaturated polyesters, unsaturated polyethers, unsaturated polyamides and unsaturated urethanes. In addition, examples of the monofunctional, bifunctional and tri- or higher multifunctional oligomers include an oligomer formed of the above-described monomer such as a straight-chain acrylic oligomer, epoxy (meth)acrylate, oxetane (meth)acrylate, aliphatic urethane (meth)acrylate, aromatic urethane (meth)acrylate and polyester (meth)acrylate.

In addition, examples of other monofunctional or multifunctional monomers may include N-vinyl compounds. Examples of the N-vinyl compounds, which are not particularly limited, include N-vinyl formamide, N-vinyl carbazole, N-vinyl acetamide, N-vinyl pyrrolidone, N-vinyl caprolactam, acryloylmorpholine and derivatives thereof.

Among the polymerizable compounds, an ester of (meth)acrylic acid, that is, (meth)acrylate, is preferable.

Examples of the monofunctional (meth)acrylates, which are not particularly limited, include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butylcyclohexyl (meth)acrylate, dicyclopentanyl (meth)acrylate and dicyclopentenyloxyethyl (meth)acrylate. Among these, phenoxyethyl (meth)acrylate is preferable.

The content of the monofunctional (meth)acrylate is preferably in the range of 30% by mass to 85% by mass, and more preferably in the range of 40% by mass to 75% by mass with respect to the total mass (100% by mass) of the ink composition. When the content is in the preferable range, the curing property, the initiator solubility, the storage stability and the discharging stability tend to be more excellent.

Examples of the monofunctional (meth)acrylates include monofunctional (meth)acrylate containing a vinyl ether group. Examples of the monofunctional (meth)acrylates, which are not particularly limited, include 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethyleneglycol monovinyl ether (meth)acrylate, polypropyleneglycol monovinyl ether (meth)acrylate, phenoxyethyl (meth)acrylate, isobornyl (meth)acrylate, and benzyl (meth)acrylate. Among these, 2-(vinyloxyethoxy)ethyl (meth)acrylate, phenoxyethyl (meth)acrylate, isobornyl (meth)acrylate and benzyl (meth)acrylate are preferable.

Among these, since it is possible to further reduce the viscosity of the ink, a flash point is high, and the curing property of the ink is excellent, at least one of 2-(vinyloxyethoxy)ethyl (meth)acrylate, that is, 2-(vinyloxyethoxy)ethyl acrylate and 2-(vinyloxyethoxy)ethyl methacrylate is preferable, and 2-(vinyloxyethoxy)ethyl acrylate is more preferable. Since both 2-(vinyloxyethoxy)ethyl acrylate and 2-(vinyloxyethoxy)ethyl methacrylate have a simple structure and a low molecular weight, it is possible to significantly reduce the viscosity of the ink. Examples of the 2-(vinyloxyethoxy)ethyl (meth)acrylates include 2-(2-vinyloxyethoxy)ethyl (meth)acrylate and 2-(1-vinyloxyethoxy)ethyl (meth)acrylate, and examples of the 2-(vinyloxyethoxy)ethyl acrylates include 2-(2-vinyloxyethoxy)ethyl acrylate and 2-(1-vinyloxyethoxy)ethyl acrylate. 2-(vinyloxyethoxy)ethyl acrylate is excellent from the viewpoint of the curing property compared to 2-(vinyloxyethoxy)ethyl methacrylate.

The content of the above-described vinyl ether group-containing (meth)acrylic acid esters, particularly 2-(vinyloxyethoxy)ethyl (meth)acrylate, is preferably in the range of 10% by mass to 70% by mass, and more preferably in the range of 30% by mass to 50% by mass with respect to the total mass (100% by mass) of the ink composition. When the content is 10% by mass or more, it is possible to reduce the viscosity of the ink, and to further enhance the curing property of the ink. Meanwhile, when the content is 70% by mass or less, it is possible to maintain the storage stability of the ink in an excellent state.

Among the above-described (meth)acrylates, examples of bifunctional (meth)acrylates include triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, EO (ethylene oxide) adduct di(meth)acrylate of bisphenol A, PO (propylene oxide) adduct di(meth)acrylate of bisphenol A, hydroxypivalic acid neopentyl glycol di(meth)acrylate, polytetramethylene glycol di(meth)acrylate, diethylene glycol di(meth)acrylate, triethylene glycol di(meth)acrylate and tri- or higher functional (meth)acrylate having a pentaerythritol skeleton or a dipentaerythritol skeleton. Among these, dipropylene glycol di(meth)acrylates are preferable. Among these, polyethylene glycol di(meth)acrylate, tripropylene glycol di(meth)acrylate, diethylene glycol di(meth)acrylate, triethylene glycol di(meth)acrylate and tri- or higher functional (meth)acrylate having a pentaerythritol skeleton or a dipentaerythritol skeleton are preferable. The ink composition more preferably includes the multifunctional (meth)acrylate in addition to the monofunctional (meth)acrylate.

The content of the bi- or higher multifunctional (meth)acrylate is preferably in the range of 5% by mass to 60% by mass, more preferably in the range of 15% by mass to 60% by mass, and still more preferably in the range of 20% by mass to 50% by mass with respect to the total mass (100% by mass) of the ink composition. When the content is in the preferable range, the curing property, the storage stability and the discharging stability tend to be more excellent.

Among the above-described (meth)acrylates, examples of the tri- or higher multifunctional (meth)acrylates include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, caprolactone-modified trimethylolpropane tri(meth)acrylate, pentaerythritol ethoxy tetra(meth)acrylate and caprolactam-modified dipentaerythritol hexa(meth)acrylate. When the ink includes tri- or higher multifunctional (meth)acrylate, it is preferable in terms of the curing property of the ink, and the content is preferably in the range of 5% by mass to 40% by mass, more preferably in the range of 5% by mass to 30% by mass, and still more preferably in the range of 5% by mass to 20% by mass with respect to the total mass (100% by mass) of the ink composition. The upper limit of the number of functional groups of a multifunctional (meth)acrylate is not limited, and is preferably 6 or less in terms of the low viscosity of the ink.

Among these, the polymerizable compound preferably includes monofunctional (meth)acrylate. In this case, the viscosity of the ink composition becomes low, the solubility of additives other than the photopolymerization initiator is excellent, and the discharging stability during ink jet recording is likely to be obtained. Furthermore, since a toughness, a heat resistance and a chemical resistance of the coating film are increased, using the monofunctional (meth)acrylate and bifunctional (meth)acrylate together is more preferable, and among these, using phenoxyethyl (meth)acrylate and dipropylene glycol di(meth)acrylate together is further more preferable.

The content of the above-described polymerizable compounds is preferably in the range of 5% by mass to 95% by mass, and more preferably in the range of 15% by mass to 90% by mass with respect to the total mass (100% by mass) of the ink composition. When the content of the polymerizable compound is in the above range, it is possible to further reduce the viscosity and the odor, and it is possible to further enhance the solubility and the reactivity of the polymerizable compound.

Coloring Material

The ink composition may further include a coloring material. The coloring material can include at least one of a pigment and a dye.

Pigment

By using a pigment as the coloring material, it is possible to improve the light resistance of the ink composition. Both an inorganic pigment and an organic pigment can be used as the pigment.

As the inorganic pigment, carbon blacks such as a furnace black, a lamp black, an acetylene black and a channel black (C. I. Pigment Black 7), iron oxide and titanium oxide can be used.

Examples of the organic pigments include azo pigments such as an insoluble azo pigment, a condensed azo pigment, an azo lake and a chelate azo pigment, polycyclic pigments such as a phthalocyanine pigment, a perylene and a perinone pigment, an anthraquinone pigment, a quinacridone pigment, a dioxane pigment, a thioindigo pigment, an isoindolinone pigment and a quinophthalone pigment, a dye chelate (for example, a base dye type chelate, an acid dye type chelate and the like), a dyeing lake (a basic dye type lake and an acidic dye type lake), a nitro pigment, a nitroso pigment, an aniline black, and a daylight fluorescent pigment.

More specifically, examples of the carbon blacks used for a black ink include No. 2300, No. 900, MCF 88, No. 33, No. 40, No. 45, No. 52, MA 7, MA 8, MA 100, No. 2200B and the like (hereinbefore, manufactured by Mitsubishi Chemical Corporation), Raven 5750, Raven 5250, Raven 5000, Raven 3500, Raven 1255, Raven 700 and the like (hereinbefore, manufactured by Carbon Columbia, Ltd.), Regal 400R, Regal 330R, Regal 660R, Mogul L, Monarch 700, Monarch 800, Monarch 880, Monarch 900, Monarch 1000, Monarch 1100, Monarch 1300, Monarch 1400 and the like (manufactured by CABOT JAPAN K. K.), Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A and Special Black 4 (hereinbefore, manufactured by Degussa).

Examples of the pigments used in a white ink include C. I. Pigment White 6, 18 and 21.

Examples of the pigments used in a yellow ink include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172 and 180.

Examples of the pigments used in a magenta ink include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245 or C. I. Pigment Violet 19, 23, 32, 33, 36, 38, 43 and 50.

Examples of the pigments used in a cyan ink include C. I. Pigment Blue 1, 2, 3, 15, 15:1, 15:2, 15:3, 15:34, 15:4, 16, 18, 22, 25, 60, 65 and 66, and C. I. Vat Blue 4 and 60.

In addition, examples of the pigments other than the magenta, the cyan, and the yellow include C. I. Pigment Green 7 and 10, C. I. Pigment Brown 3, 5, 25 and 26, and C. I. Pigment Orange 1, 2, 5, 7, 13, 14, 15, 16, 24, 34, 36, 38, 40, 43 and 63.

The pigments described above may be used alone or in combinations of two or more kinds thereof.

In the case of using the above-described pigment, an average particle size is preferably 300 nm or less, and more preferably 50 nm to 200 nm. When the average particle size is in the above range, reliability such as the discharging stability and the dispersion stability of the ink composition are further improved, and an image with excellent image quality can be formed. Here, the average particle size in the specification is measured by a dynamic light scattering.

Dye

As the coloring material, a dye can be used. As the dye, which is not particularly limited, an acidic dye, a direct dye, a reactive dye and a basic dye can be used. Examples of the above-described dyes include C. I. Acid Yellow 17, 23, 42, 44, 79 and 142, C. I. Acid Red 52, 80, 82, 249, 254 and 289, C. I. Acid Blue 9, 45 and 249, C. I. Acid Black 1, 2, 24 and 94, C. I. Food Black 1 and 2, C. I. Direct Yellow 1, 12, 24, 33, 50, 55, 58, 86, 132, 142, 144 and 173, C. I. Direct Red 1, 4, 9, 80, 81, 225 and 227, C. I. Direct Blue 1, 2, 15, 71, 86, 87, 98, 165, 199 and 202, C. I. Direct Black 19, 38, 51, 71, 154, 168, 171 and 195, C. I. Reactive Red 14, 32, 55, 79 and 249, and C. I. Reactive Black 3, 4 and 35.

The pigments described above may be used alone or in combinations of two or more kinds thereof.

The content of the coloring material is preferably in the range of 1% by mass to 20% by mass with respect to the total mass (100% by mass) of the ink composition since an excellent concealing property and color reproducibility are obtained.

Dispersant

In the case where the ink composition includes a pigment, a dispersant may be included to further improve a pigment dispersibility. Examples of the dispersants, which are not particularly limited, include dispersants which are commonly used in the preparation of pigment dispersions such as a polymer dispersant. Specific examples thereof include dispersants containing one or more kinds among polyoxyalkylene polyalkylene polyamine, vinyl-based polymers and copolymer, acrylic polymer and copolymer, polyester, polyamide, polyimide, polyurethane, amino-based polymer, silicon-containing polymer, sulfur-containing polymer, fluorine-containing polymer and epoxy resin, as a main component. Examples of commercially available polymer dispersants include the Ajisper series by Ajinomoto Fine-Techno Co., Inc., the Solsperse series (Solsperse 36000, etc.) available from Avecia, Inc. and Noveon, Inc., and the Disperbyk series of BYKChemie and the Disparlon series of Kusumoto Chemicals, Ltd.

Other Additives

The ink composition may include additives (component) other than additives described above. Examples of the components, which are not particularly limited, include a slipping agent (surfactant), a polymerization accelerator, a penetration enhancer, a wetting agent (humectant), and other additives known in the related art. Examples of the other additives described above include a fixing agent, an antifungal agent, a preservative, an antioxidant, an ultraviolet absorbent, a chelating agent, a pH adjusting agent and a thickener known in the related art.

Preparation of Ink Composition

The ink composition can be prepared by uniformly mixing a dye, and other additive components as necessary, and removing the insoluble material by filtering. As the preparation method, which is not particularly limited, known methods in the related art can be used.

Configuration of Ink Jet Recording Apparatus

The ultraviolet ray curable ink jet recording apparatus of the embodiment is provided with a head for discharging the ink composition for the ultraviolet ray curable ink jet recording, the ink flow path supplying the ink composition for the ultraviolet ray curable ink jet recording to the head, and the gear pump for circulating the ink composition for the ultraviolet ray curable ink jet recording to the ink flow path. In the embodiment, the ink jet recording apparatus is provided with the gear pump for circulating the ink composition in the ink flow path. Here, "ink flow path" refers to a flow path for circulating the ink composition in the ink jet recording apparatus. Examples of the ink flow paths include an ink supply path for supplying the ink composition from the ink container for storing the ink composition to the ink jet recording head, a flow path for circulating the ink composition in the ink jet recording head to a nozzle opening, and the following ink circulation path.

FIG. 1 is a block diagram showing an example of a configuration of the ultraviolet ray curable ink jet recording apparatus (hereinafter, referred to as "printer") of this embodiment. To form an image at a printer 1, a computer 130 outputs printing data to the printer 1 corresponding to the image. The printer 1 is a recording apparatus for forming an image on the recording medium, and is connected to be able to communicate with the computer 130 which is an external apparatus.

The printer 1 has an ink supply unit 10, a transport unit 20, a head unit 30, an irradiation unit 40, a detector group 110, a memory 123, an interface 121 and controller 120. The printer 1 which receives a printing data from the computer 130 controls each unit by the controller 120 and records an image on the recording medium according to the printing data. The situation in the printer 1 is monitored by the detector group 110, and the detector group 110 outputs the detection result to the controller 120. The controller 120 controls respective units on the basis of the detection result output from the detector group 110. The controller 120 stores the printing data input through the interface 121 in the memory 123, and has a CPU 122 and a unit control circuit 124. In the memory 123, control information for controlling the respective units is also stored.

The ultraviolet ray curable ink jet recording apparatus is preferably a line printer. In the case of the line printer, since when the supply amount of the ink composition is large, the durability of the gear pump in particular becomes problematic, the ultraviolet ray curable ink jet recording apparatus of the embodiment is particularly useful.

Figure 2:
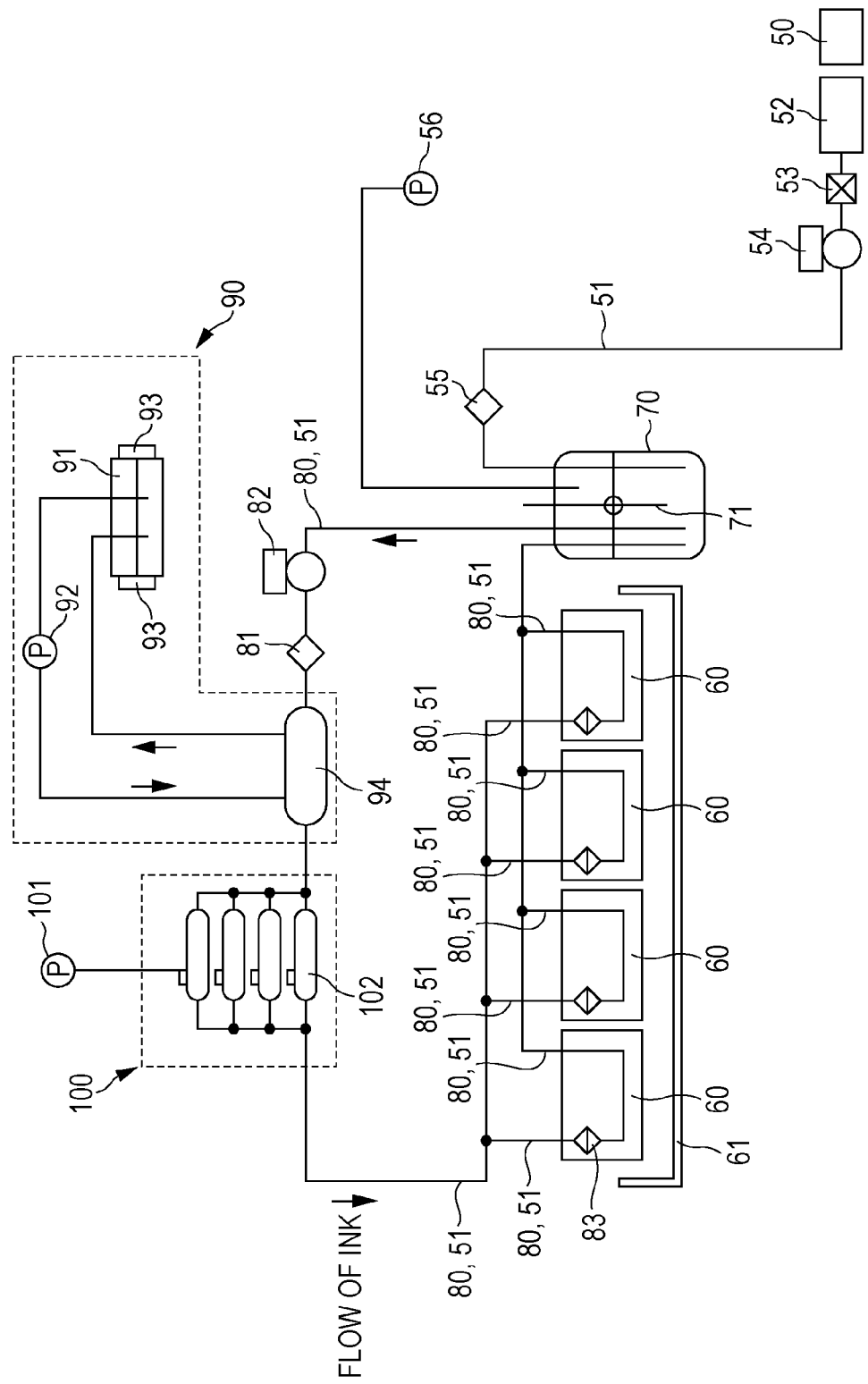
FIG. 2 is a diagram showing an example of a configuration of an ink supply unit provided in the ultraviolet ray curable ink jet recording apparatus of the embodiment.

FIG. 2 is a diagram showing an example of an ink supply unit provided in the ultraviolet ray curable ink jet recording apparatus of the embodiment. An ink supply apparatus 10 is disposed between an ink cartridge 50 and a head 60 in the ink jet recording apparatus. The ink supply apparatus 10 is provided with the ink cartridge 50, the ink flow path 51 (preferably, the ink flow path 51 including an ink circulation path 80), a sub-tank 70, a heating apparatus 90, a deaeration apparatus 100, and a head 60. The head 60 also belongs to the head unit 30 described above. The ink supply apparatus 10 has the gear pump.

Gear Pump

The ink jet recording apparatus of the embodiment is provided with the gear pump for circulating the ink composition for the ultraviolet ray curable ink jet recording in the ink flow path. By using the gear pump, the durability and the discharging stability of the ink jet recording apparatus are improved. The gear pump is not particularly limited as long as it is installed in the ink flow path, and circulates the ink composition for the ultraviolet ray curable ink jet recording to the ink flow path, and as the installation position, the positions of a circulation pump 82 and a supply pump 54 shown in FIG. 2 are exemplified. In addition to the above positions, in the ink circulation path 80 in FIG. 2, it may be a location other than the circulation pump 82, and may be on the side further downstream of the sub-tank side than the head. It is not limited as long as the ink circulated through the gear pump is finally supplied to the head.

Figure 3:
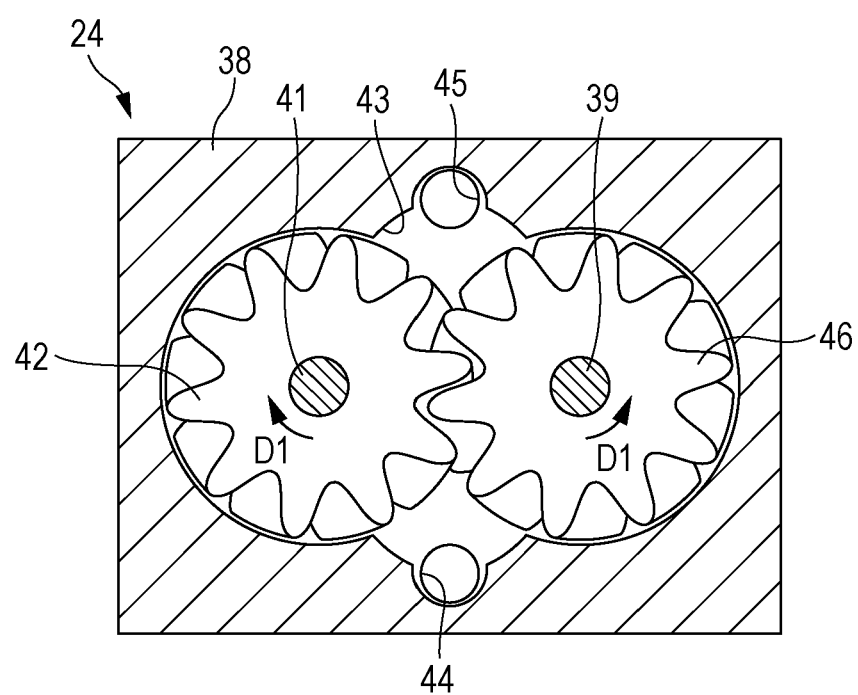
FIG. 3 is a cross-sectional schematic view showing an example of a gear pump used in the embodiment.

FIG. 3 is a cross-sectional schematic view showing an example of the gear pump used in the embodiment. As shown in FIG. 3, the gear pump 24 is provided with a case 38, a driving shaft 39, a driving gear 46 which rotates integrally with the driving shaft 39, a driven shaft 41, and a driven gear 42 which rotates integrally with the driven shaft 41. That is, the driving gear 46 and the driven gear 42 function as a rotating body which rotates around the driving shaft 39 and the driven shaft 41 as an axis.

In FIG. 3, the driving shaft 39 and the driven shaft 41 are provided in mutually parallel manner. Then, the driving gear 46 and the driven gear 42 are each in a pair of rotatable helical gears, and are housed in a pump chamber 43 (fluid chamber) in an engaged state with each other. Moreover, in the pump chamber 43, a suction opening 44 and a discharge opening 45 with which the ink circulation path 80 is connected are formed. When the driving shaft 39, the driving gear 46, the driven shaft 41, and the driven gear 42 rotate in the forward direction D1 indicated by arrows in FIG. 3, the gear pump 24 sucks the ink composition from the suction opening 44 in response to the rotary motion of the driving gear 46 and the driven gear 42, and discharges the ink composition from the discharge opening 45 while making the ink composition in the pump chamber 43 flow.

Moreover, the gear pump 24 preferably includes a non-metallic material on the surface of at least an engagement portion of the gear 46 which is a member having the engagement portion (groove) that is in contact with the ink, and engaged with other member, and preferably includes at least one selected from a group consisting of polyphenylene sulfide, polyethylene terephthalate, polybutylene terephthalate and ceramic. As the ceramic, one or more kinds of metal oxides, metal carbides, metal nitrides and metal borides are preferable. Thus, the durability of the ink jet recording apparatus is further improved. The cause in which the durability is improved is considered that in the case where these materials are used, when the ink is in contact with the member, the swelling of the member by the ink component is small, and since impurities included in these materials are small, foreign materials produced from the components included in the ink due to the impurities are small, and thus, the occurrence of trouble in the rotation by a failure generated in the engagement of the member due to the swelling and the foreign materials is low, and the cause is not limited thereto. A surface contacting with at least the ink of the case 38 can also be made of the above-described material, and it may be formed of a material (polyacetal, polypropylene, polyethylene, polycarbonate, silicone rubber and the like) having gas permeability (oxygen permeability). Thus, fixation of the ink composition in the gear pump 24 can be further suppressed, whereby the durability of the ink jet recording apparatus is further improved.

The ink composition feed amount of the gear pump 24 is preferably 10 g/min or more, more preferably 50 g/min or more, still more preferably 70 g/min or more, particularly preferably 100 g/min, and even more preferably 200 g/min or more. In addition, the ink composition feed amount is preferably 400 g/min or less, and more preferably 300 g/min or less. When the feed amount is in the above range, it is possible to secure a printing speed by supplying the ink amount required for printing to the head, in order to suppress the heat locally generated at the engagement portion of the gear 46, and it is preferable in terms of the durability of the gear pump 24. In addition, in the case where a circulation path in which the ink composition circulates is provided, the dissolved oxygen content and the temperature of the ink composition are likely to be maintained in a predetermined range. For this reason, when the ink composition feed amount is in the above range, it is possible to more stably supply the ink composition, the dissolved oxygen content and the temperature of the ink composition are more stable, and the durability of the gear pump 24 is also further improved.

Heating Apparatus

The ink jet recording apparatus of the embodiment is preferably further provided with a heating apparatus (for example, a heating apparatus 90 shown in FIG. 2) for heating the ink composition in the ink flow path. In the case where the heating apparatus is provided, there is a tendency that the thickening material is likely to be generated in the ink composition when the temperature of the ink composition is high. When the thickening material is generated, the gear pump is likely to be fixed. Therefore, in the case where the heating apparatus is provided, the ink jet recording apparatus according to the embodiment is particularly useful. The heating temperature is preferably in the range of 35° C. to 70° C.

The heating apparatus 90 is not particularly limited as long as it is provided in the ink flow path. In FIG. 2, it is provided in the ink circulation path 80, and more specifically it is disposed in the middle of the ink circulation path 80, that is, between the sub-tank 70 and the head 60. The heating apparatus 90 is preferably disposed on the side further downstream than the gear pump in the direction in which the ink is supplied, and on the side further upstream than the head 60. In this manner, by making the ink flow into the gear pump before heating is performed by the heating apparatus, the durability of the gear pump can be further improved. The heating apparatus 90 heats the ink composition. By the heating apparatus, the discharging temperature and a discharging viscosity of the ultraviolet ray curable ink composition which is discharged can be controlled. The discharging temperature is preferably in the range of 28° C. to 50° C., more preferably in the range of 28° C. to 45° C., and still more preferably in the range of 28° C. to 40° C. The discharging viscosity is preferably 15 mPa·s or less, and more preferably in the range of 5 mPa·s to 15 mPa·s.

Examples of the heating apparatus 90, which are not particularly limited, include a heating apparatus which circulates hot water of a hot water tank 91 between a temperature control module 94 and the hot water tank 91 by a hot water circulation pump 92, and heats the ink composition of the ink circulation path 80 by the temperature control module 94. A heater 93 of the hot water tank 91 adjusts the temperature of a circulating ink composition to a target temperature.

Deaeration Apparatus

The ink jet recording apparatus of the embodiment preferably further has the deaeration apparatus in the ink flow path. The deaeration apparatus deaerates the ink composition. The deaeration apparatus 100 is not particularly limited as long as it is provided in the ink flow path. It can be provided in the ink circulation path 80, more specifically in the middle of the ink circulation path 80, that is, between the sub-tank 70 and the head 60. The ink composition deaerated by the deaeration apparatus 100 is supplied to the head 60. The deaeration apparatus 100 is preferably provided in the direction in which the ink composition is supplied, on the side further downstream than the heating apparatus 90 (more specifically, the temperature control module 94 of the ink circulation path 80), and on the side further upstream than the head 60. Thus, by disposing the deaeration apparatus 100 on the downstream side of the heating apparatus 90, deaeration is performed in a state in which the temperature of the ink composition is high, and it is possible to further increase the deaeration efficiency. A deaeration module 102 is provided with a deaeration chamber (not shown in the figure) into which the ink composition is flowed, and a decompression chamber (not shown in the figure) which is in contact with the deaeration chamber through a separation membrane which is impermeable to liquid such as the ink composition. A negative pressure pump 101 depressurizes the decompression chamber. When the decompression chamber is depressurized, an amount of dissolved air of the ink composition in the ink circulation path 80 is reduced, and bubbles are removed. In this manner, the deaeration apparatus 100 can deaerate the ink composition in the ink circulation path 80. There is a tendency that the dissolved oxygen content of the ink composition flowed out from the deaeration apparatus is decreased to be in the range of 5% when the dissolved oxygen content of the ink composition flowed into the deterioration apparatus is set to 100%, and by circulating the ink composition, the dissolved oxygen content (concentration) of the ink composition in the ink circulation path 80 is stabilized during printing. The deaeration apparatus 100 is preferably provided in the direction in which the ink composition is supplied, on the side further downstream than the gear pump 82, and on the side further upstream than the head 60. By making the ink flow into the gear pump before deaeration is performed by the deaeration apparatus, the durability of the gear pump 82 can be further improved.

Examples of the deaeration apparatus, which are not particularly limited, include one which transports the ink composition and has the separation membrane which performs the deaeration.

Ink Circulation Path

The ink flow path further includes an ink circulation path, and the ink jet recording apparatus is preferably provided with a deaeration apparatus and a gear pump in the ink circulation path. The ink flow path preferably has at least a part of the ink circulation path. In FIG. 2, an ink flow path 51 has an ink circulation path 80, the ink circulation path 80 is connected to a sub-tank 70 and a head 60, the ink composition is supplied from the sub-tank 70 to the ink circulation path 80, and the ink composition can be supplied to the head 60. In this manner, by circulating the ink composition by the ink circulation path 80, it is possible to make the temperature of the ink composition heated by a heating apparatus 90 described below be constant, to make a deaeration efficiency be higher, or to prevent components included in the ink composition from precipitating by making the ink composition flow.

In addition, the ink circulation path 80 may have a filter 81, a circulation pump 82 and a head filter 83. The filter 81 is provided on the downstream side of the circulation pump 82 in the ink circulation path 80, and filters foreign materials in the ink composition. A part of the ink circulation path 80 is provided in the head 60, and through the head filter 83 which filters the foreign materials in the ink composition, at least a part of the ink composition which circulates is discharged from the head 60.

Here, the gear pump can be adopted as the circulation pump 82. In addition, in the ink flow path 51 shown in FIG. 2, a holder 52, a valve 53, a supply pump 54 and a filter 55 are provided in a pipe between the ink cartridge 50 and the sub-tank 70. The gear pump can be also adopted as the supply pump 54.

The dissolved oxygen content of the ink composition in the ink circulation path 80 is determined according to the dissolved oxygen content of the ink composition housed in the ink cartridge 50 and a deaeration ability to deaerate with the deaeration apparatus 100. The non-deaerated ink composition is sequentially replenished from the sub-tank 70 to the ink circulation path 80 due to the consumption of the ink composition, and by dissolution of oxygen from the outside into the ink composition, the dissolved oxygen content of the ink composition is slightly increased during the process in which the ink composition is fed from the ink cartridge 50 to the ink circulation path 80, and the circulation. Accordingly, by having the deaeration apparatus 100 and the gear pump (circulation pump 82) in the ink circulation path 80, it is possible to control such that the dissolved oxygen content of the ink composition flowed into the gear pump (circulation pump 82) in the ink circulation path 80 is a predetermined concentration. The deaeration apparatus may be provided on the upstream side of the gear pump.

Ink Jet Recording Method

In the ink jet recording method of the embodiment, the ink composition for the ultraviolet ray curable ink jet recording containing the hindered amine compound is circulated to the ink flow path by the gear pump, is supplied to the head, and is discharged from the head using the ultraviolet ray curable ink jet recording apparatus. Thus, the ultraviolet ray curable ink jet recording apparatus can be used with an excellent durability and discharging amount stability. The aspect of the ink jet recording method will be specifically described.

By a gear pump (supply pump 54), the ink composition is transported from an ink cartridge 50 to a sub-tank 70 through an ink flow path 51. The ink composition transported to the sub-tank 70 is sequentially replenished from the sub-tank 70 to the ink circulation path 80 due to the consumption of the ink composition from the head 60. By the gear pump (circulation pump 82), the ink composition transported to the ink circulation path 80 circulates in the ink circulation path 80, and is supplied to the head 60 through a heating apparatus 90 and a deaeration apparatus 100 via the head filter 83. At least a part of the ink composition supplied to the head 60 is discharged from the head 60.

EXAMPLES

Hereinafter, the embodiments of the invention will be further specifically described with reference to Examples, but the invention is not limited to Examples.

Raw Materials Used

The raw materials used in the following Examples and Comparative Examples are as follows.

Coloring Material

C. I. Pigment Black 7 (Microlith Black C-K (trade name), manufactured by BASF Corp., abbreviated as "black pigment" in the table below)

Dispersant

Solsperse 36000 (trade name, manufactured by Noveon, Inc.)

Polymerizable Compound

VEEA (2-(2-vinyloxyethoxy)ethyl acrylate, trade name, manufactured by Nippon Shokubai Co., Ltd.)

PEA (phenoxyethyl acrylate, trade name Viscoat #192, manufactured by Osaka Organic Chemical Industry Ltd.)

DPGDA (dipropylene glycol diacrylate, trade name SR508, manufactured by Sartomer Co., Ltd.)

Hindered Amine Compound (Polymerization Inhibitor)

ADK STAB LA-82 (1,2,2,6,6-pentamethyl-4-piperidyl methacylate, trade name, manufactured by Adeka Co., Ltd, abbreviated as "LA-82" in the table below)

ADK STAB LA-7RD (2,2,6,6-tetramethyl-4-hydroxypiperidine-1-oxyl, trade name, manufactured by Adeka Co., Ltd, abbreviated as "LA-7RD" in the table below)

TINUVIN 144 (bis(1,2,2,6,6-pentamethyl-4-piperidyl)[3,5-bis(1,1-dimethylethyl)-4-hydroxyphenyl]methyl]butyl malonate, trade name, manufactured by BASF Corp.)

Polymerization Inhibitor

MEHQ (p-methoxyphenol, manufactured by Tokyo Chemical Industry Co., Ltd)

Photopolymerization Initiator

Acylphosphine Oxide-Based Compound

IRGACURE 819 (trade name, manufactured by BASF Corp., 100% solid content)

DAROCUR TPO (trade name, manufactured by BASF Corp., 100% solid content)

Acetophenone-Based Compound

IRGACURE 369 (trade name, manufactured by BASF Corp., 100% solid content)

Ink Jet Recording Apparatus

An ink jet printer Surepress L-4033A (manufactured by Seiko Epson Corporation) which was remodeled was used (hereinafter, referred to as "the remodeled printer"). The remodeled portions are as follows. A gear pump, an ink circulation path, a deaeration apparatus and a heating apparatus were provided, a light source was arranged on the downstream side in a recording medium transport direction of a line head, and one pass printing using an ultraviolet ray curable ink was made possible. The arrangement of a gear pump and the like is the same as those shown in FIG. 2. Hereinafter, the description will be made.

An ink flow path has an ink circulation path, and the deaeration apparatus and the heating apparatus are provided at an ink circulation path. In the gear pump, a gear 46 was replaced with a gear which is configured with material in Table using AK55F-S12C (product name, manufactured by Assist), and it was installed in a supply pump 54 and a circulation pump 82 shown in FIG. 2. The deaeration apparatus was provided with a deaeration module 102 shown in FIG. 2 described above. In addition, the heating apparatus circulated hot water of a hot water tank between a temperature control module and the hot water tank by a hot water circulation pump, and the ink of the ink circulation path was heated by the temperature control module. Moreover, in the following Comparative Example 4, a tube pump (tube pump manufactured by Welco Co., Ltd., product name: WP1000) was used instead of the gear pump. Moreover, in Comparative Examples 5 and 6, a diaphragm pump (diaphragm pump manufactured by IWAKI & CO., LTD., product name: LK) was used instead of the gear pump.

Moreover, a dissolved oxygen content of the ink composition in the ink circulation path was adjusted in the following manner. The ink composition contained in a cartridge was prepared as follows. A reduced pressure deaeration was performed by adjusting a deaeration time of a vacuum pump such that each adjusted ink composition has the dissolved oxygen content of each example in Table, and the ink composition was housed in the cartridge. The ink circulation path 80 was filled with the ink of each example from the cartridge through an ink flow path 51 in FIG. 2. The ink flow rate of the gear pump 82 was set to be 300 g/min. The ink was heated by operating the temperature control module 94. The deaeration module 102 was operated, and the ink was deaerated such that the dissolved oxygen content of the ink which was spontaneously increased was offset and stabilized. Thus, the ink was circulated for 30 minutes such that the temperature and the dissolved oxygen content of the ink were stable. The temperature of the ink of each example was 40° C., and the dissolved oxygen content was a value of each example in Table. The temperature of the ink was an ink temperature measured at a nozzle surface of the head. The ink was collected from the ink circulation path 80 immediately before flowing into the gear pump 82, and the dissolved oxygen content of the ink was measured. Examples 1 to 20 and Comparative Examples 1 to 6

Preparation of Ink Composition for Ultraviolet Ray Curable Ink Jet Recording

The components described in Table below are added so as to make the compositions (the unit is % by mass) described in Table below, and the resultants were stirred with a stirrer, whereby the ink compositions for the ultraviolet ray curable ink jet recording were prepared.

Measurement of Dissolved Oxygen Content

The dissolved oxygen content of the ink composition collected from the ink circulation path 80 immediately before the ink composition was flowed into the gear pump 82 was measured using a gas chromatography Agilent 6890 (manufactured by Agilent Technologies), and it was confirmed that the dissolved oxygen content became values in Table. As a carrier gas, helium (He) gas was used. The dissolved oxygen content of the ink composition is a volume of oxygen (gas) dissolved in the ink composition (liquid) of a predetermined volume shown in ppm.

TABLE

| | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| C. I. Pigment Black 7 | | | | | | | | | 2.0 | 2.0 | 2.0 | 2.0 | 2.0 | 2.0 |
| Solsperse 36000 | | | | | | | | | 1.0 | 1.0 | 1.0 | 1.0 | 1.0 | 1.0 |
| VEEA | 30.0 | 30.0 | 30.0 | 30.0 | 30.0 | 30.0 | 30.0 | 30.0 | 30.0 | 30.0 | 30.0 | 30.0 | 30.0 | 30.0 |
| PEA | 20.0 | 20.0 | 20.0 | 20.0 | 20.0 | 20.0 | 20.0 | 20.0 | 20.0 | 20.0 | 20.0 | 20.0 | 20.0 | 20.0 |
| DPGDA | 37.8 | 37.8 | 37.8 | 37.4 | 37.5 | 37.8 | 37.8 | 37.9 | 34.8 | 34.8 | 34.8 | 34.8 | 34.8 | 34.8 |
| TINUVIN 144 | | 0.1 | | | | | | | | | | | | |
| LA-82 | | | 0.1 | | | | | | | | | | | |
| LA-7RD | 0.1 | | | 0.5 | 0.4 | 0.1 | 0.06 | 0.05 | 0.1 | 0.1 | 0.1 | 0.1 | 0.1 | 0.1 |
| MEHQ | 0.1 | 0.1 | 0.1 | 0.1 | 0.1 | 0.1 | 0.1 | 0.1 | 0.1 | 0.1 | 0.1 | 0.1 | 0.1 | 0.1 |
| IRGACURE 819 | 5.0 | 5.0 | 5.0 | 5.0 | 5.0 | 5.0 | 5.0 | 5.0 | 5.0 | 5.0 | 5.0 | 5.0 | 5.0 | 5.0 |
| IRGACURE TPO | 5.0 | 5.0 | 5.0 | 5.0 | 5.0 | 5.0 | 5.0 | 5.0 | 5.0 | 5.0 | 5.0 | 5.0 | 5.0 | 5.0 |
| IRGACURE 369 | 2.0 | 2.0 | 2.0 | 2.0 | 2.0 | 2.0 | 2.0 | 2.0 | 2.0 | 2.0 | 2.0 | 2.0 | 2.0 | 2.0 |
| Pump | Gear PPS | Gear PPS | Gear PPS | Gear PPS | Gear PPS | Gear PPS | Gear PPS | Gear PPS | Gear PPS | Gear POM | Gear PTFE | Gear Ceramic | Gear PET | Gear PPS |
| Dissolved oxygen content (ppm) | 10 | 10 | 10 | 10 | 10 | 10 | 10 | 10 | 10 | 10 | 10 | 10 | 10 | 30 |
| Durability | A | B | B | A | A | A | A | B | A | B | B | A | A | A |
| Discharging stability | A | A | A | A | A | A | A | A | A | A | A | A | A | B |
| Curing property | A | A | A | A | A | A | A | A | A | A | A | A | A | A |
| Discharging amount stability | A | A | A | A | A | A | A | A | A | A | A | A | A | A |

| | Examples | | | | | | Comparative Examples | | | | | |
|---|---|---|---|---|---|---|---|---|---|---|---|---|
| | 15 | 12 | 17 | 18 | 19 | 20 | 1 | 2 | 3 | 4 | 5 | 6 |
| C. I. Pigment Black 7 | 2.0 | 2.0 | 2.0 | 2.0 | 2.0 | 2.0 | | | | 2.0 | 2.0 | 2.0 |
| Solsperse 36000 | 1.0 | 1.0 | 1.0 | 1.0 | 1.0 | 1.0 | | | | 1.0 | 1.0 | 1.0 |
| VEEA | 30.0 | 30.0 | 30.0 | 30.0 | 30.0 | 30.0 | 30.0 | 30.0 | 30.0 | 30.0 | 30.0 | 30.0 |
| PEA | 20.0 | 20.0 | 20.0 | 20.0 | 20.0 | 20.0 | 20.0 | 20.0 | 20.0 | 20.0 | 20.0 | 20.0 |
| DPGDA | 34.8 | 34.8 | 34.8 | 34.8 | 34.8 | 34.8 | 37.9 | 37.9 | 37.8 | 34.9 | 34.9 | 34.9 |
| TINUVIN 144 | | | | | | | | | | | | |
| LA-82 | | | | | | | | | | | | |
| LA-7RD | 0.1 | 0.1 | 0.1 | 0.1 | 0.1 | 0.1 | | | | 0.1 | 0.1 | 0.1 |
| MEHQ | 0.1 | 0.1 | 0.1 | 0.1 | 0.1 | 0.1 | 0.1 | 0.1 | 0.2 | | | |
| IRGACURE 819 | 5.0 | 5.0 | 5.0 | 5.0 | 3.0 | 5.0 | 5.0 | 5.0 | 5.0 | 5.0 | 5.0 | 5.0 |
| IRGACURE TPO | 5.0 | 5.0 | 5.0 | 5.0 | 3.0 | 5.0 | 5.0 | 5.0 | 5.0 | 5.0 | 5.0 | 5.0 |
| IRGACURE 369 | 2.0 | 2.0 | 2.0 | 2.0 | 6.0 | 2.0 | 2.0 | 2.0 | 2.0 | 2.0 | 2.0 | 2.0 |
| Pump | Gear PPS | Gear PPS | Gear PPS | Gear PPS | Gear PPS | Gear PBT | Gear PPS | Gear PPS | Gear PPS | Tube — | Diaphragm — | Diaphragm — |
| Dissolved oxygen content (ppm) | 20 | 5 | 2 | 1 | 30 | 10 | 10 | 30 | 30 | 10 | 10 | 30 |
| Durability | A | A | A | B | A | A | D | C | C | C | A | A |
| Discharging stability | A | A | A | A | A | A | A | A | A | A | A | B |
| Curing property | A | A | A | A | B | A | A | A | A | A | A | A |
| Discharging amount stability | A | A | A | A | A | A | A | A | A | A | B | B |

PPS: polyphenylene sulfide
PET: polyethylene terephthalate
PBT: polybutylene terephthalate
POM: polyacetal
PTFE: polytetrafluoroethylene
Ceramic: silicon carbide and silicon nitride mixture Evaluation Test
Durability Test The ink composition of each Example and each Comparative Example was fed at an ink flow rate of 300 g/min using the remodeled printer. The time until the gear was locked, and thus it was not possible to circulate in the gear pump, the time until the tube pump was damaged, and thus it was not possible to circulate in the tube pump, and the time until the diaphragm was damaged, and thus it was not possible to circulate in a diaphragm pump were measured, and the durability was evaluated according to the following evaluation criteria. Moreover, when the locked gear pump was disassembled and was observed, thickening material that is considered to be derived from the ink had adhered around the gear. In addition, during circulation, it was observed that the engagement portion of the gear generates heat.

Evaluation Criteria
A: longer than 2000 hours
B: longer than 500 hours to 2000 hours or less
C: longer than 24 hours to 500 hours or less
D: 24 hours or less Discharging Stability Test The ink composition of each Example and each Comparative Example was continuously discharged from one head (the number of nozzles is 600) at a discharging frequency of 10 KHz using the remodeled printer. The nozzles were inspected for the presence of undischarged nozzles each time discharging was performed for one minute, and the cumulative time of the discharging time at the time point in which the undischarged nozzles were found was measured as a continuous discharge possible time. On the basis of the time, the discharging stability was evaluated according to the following evaluation criteria.

Evaluation Criteria
A: more than 60 minutes
B: more than 20 minutes to 60 minutes or less
C: more than 10 minutes to 20 minutes or less
D: more than 0 minutes to 10 minutes or less Discharging Amount Stability Test Using the remodeled printer, while transporting the recording medium, the ink composition of each Example and each Comparative Example was continuously discharged from one nozzle to a recording medium (PET 50A NPL manufactured by Lintec Corporation) for 10 minutes, ultraviolet ray from a light source (LED) which was arranged on the side further downstream than the head in the transport direction was radiated, and the ink which was adhered to the recording medium was cured, whereby dots were formed. A dot diameter of a dot array formed was measured, and a ratio of a difference between the maximum dot diameter and the minimum dot diameter with respect to average dot diameter was calculated. On the basis of the ratio, a discharging amount stability was evaluated according to the following evaluation criteria.

Evaluation Criteria
A: 5% or less
B: more than 5%

The discharging amount stability was poor due to the influence of the pulsation in Comparative Examples 5 and 6 using the diaphragm pump, and dots having a small dot diameter and a large dot diameter periodically appeared. In other pumps, the difference in dot diameter was small, and periodical change thereof was not observed.

Curing Property Test

Using a bar coater, the ink composition of each Example and each Comparative Example was coated on a PET film (PET 50A NPL (trade name), manufactured by Lintec Corporation), and an ink coating film having a thickness of 10 μm after curing was prepared. Thereafter, ultraviolet ray of which irradiation intensity is 1,100 mW/cm$^2$ and a wavelength is 395 nm was radiated, and by this, the above-described coating film was cured. The cured coating film (cured film) was rubbed 10 times with a 100 g weight using a cotton swab, and a curing energy (irradiation energy) at the time point in which the wound does not occur was determined.

Moreover, after measuring irradiation intensity [mW/cm$^2$] on the irradiated surface to be radiated from the light source, from the product of this and a duration of irradiation [s], the irradiation energy [mJ/cm$^2$] was determined. The measurement of the irradiation intensity was performed using an ultraviolet ray intensity meter UM-10 and a light-receiving unit UM-400 (manufactured by Konica Minolta Sensing, Inc.). The curing property was evaluated according to the following evaluation criteria.

Evaluation Criteria
A: 200 mJ/cm$^2$ or less
B: more than 200 mJ/cm$^2$

From the comparison of Example 14 and Example 19, it was considered that when the ink composition included an acylphosphine oxide-based initiator, the curing property of the ink composition was excellent. However, these became bubble nuclei and induced generation of bubbles, the discharging stability deteriorated, and thus, there was a tendency that the discharging stability in the case where the dissolved oxygen content is large is decreased. Therefore, it is necessary to reduce the dissolved oxygen content in order to improve the discharging stability, and in this case, it was found that the invention is particularly useful.

In addition, from the comparison of Example 14 and Comparative Example 2, it was considered that when the ink composition includes a pigment, the pigment becomes bubble nuclei, induces generation of bubbles, and thus, there is a case where the discharging stability in the case where the dissolved oxygen content is large is decreased. In the case where the pigment is included in the ink for use in coloring, it is necessary to reduce the dissolved oxygen content in order to improve the discharging stability, and in this case, it was found that the invention is particularly useful.

As described above, it was found that the ultraviolet ray curable ink jet recording apparatus of the invention has an excellent durability and discharging amount stability, and excellent curing property, discharging stability also. In contrast, in Comparative Examples 1 to 3, since the hindered amine compound was not included, the ink composition in the gear pump was fixed, and thus, the durability was poor. In addition, in Comparative Example 4, since the tube pump was used instead of the gear pump, the time until the tube was damaged, and thus it was not possible to circulate, was short, and the durability was poor. In addition, in Comparative Examples 5 and 6, since the diaphragm pump was used instead of the gear pump, the discharging amount stability was poor due to the influence of the pulsation, and dots having a small dot diameter and a large dot diameter periodically appeared.

Furthermore, it was found that by containing the hindered amine compound, the ink composition used in the invention can improve the durability of the ultraviolet ray curable ink jet recording apparatus. Additionally, it was found that when the ink composition contains the hindered amine compound in the range of 0.05% by mass to 0.5% by mass, or the hindered amine compound includes a compound having a 2,2,6,6-tetramethylpiperidine-N-oxyl skeleton, the durability of the ultraviolet ray curable ink jet recording apparatus can be further improved.

In addition, in the case of where at least one of polyphenylene sulfide, polyethylene terephthalate, polybutylene terephthalate and ceramic is included as the material of the gear pump, the durability was particularly excellent. It was observed that swelling of these materials when the material came into contact with the ink composition of the embodiment was small compared to in other materials, and therefore it is considered that the gears did not come into contact with each other by the swelling.

Furthermore, in Example 19, when evaluation was performed in the same manner as in Example 19 except that DPGDA of 34.8% by mass in the ink composition was replaced with pentaerythritol tetraacrylate (manufactured by Shin-Nakamura Chemical Co.) of 10% by mass and DPGDA of 24.8% by mass, the durability was B, the discharging stability was A, the curing property was A, and the discharging amount stability was A. In the case where the ink includes tri- or higher multifunctional (meth)acrylate, the curing property of the ink was more excellent, and there was a tendency that the durability was decreased, and it was found that the invention is particularly useful.

Furthermore, when evaluation was performed in the same manner as in Example 1 except that an ink flow rate of the gear pump was set to be 40 g/min, it was found that the temperature and the dissolved oxygen content of the ink tend to be unstable. In addition, when evaluation was performed in the same manner as in Example 1 except that an ink flow rate of the gear pump was set to be 500 g/min, the durability was decreased to be B.

The entire disclosure of Japanese Patent Application No.: 2013-061558, filed Mar. 25, 2013 and 2013-100996, filed May 13, 2013 are expressly incorporated by reference herein.

What is claimed is:

1. An ink jet recording method, comprising:
    circulating an ink composition for an ultraviolet ray curable ink jet recording containing a hindered amine compound to an ink flow path by a gear pump, the ink having a dissolved oxygen content in a range of 2 ppm to 20 ppm as the ink flows through the gear pump;
    supplying the ink to a head; and
    discharging the ink from the head.

2. The ink jet recording method of claim 1,
    wherein the ink composition for the ultraviolet ray curable ink jet recording contains the hindered amine compound in a range of 0.05% by mass to 0.5% by mass.

3. The ink jet recording method of claim 1,
    wherein the hindered amine compound includes a compound having a 2,2,6,6-tetramethylpiperidine-N-oxyl skeleton.

4. The ink jet recording method of claim 1,
    wherein the gear pump includes at least one material selected from a group consisting of polyphenylene sulfide, polyethylene terephthalate, polybutylene terephthalate and ceramic.

5. The ink jet recording method of claim 1,
    further comprising deaerating the ink by a deaeration apparatus as the ink flows along the ink flow path.

6. The ink jet recording method of claim 5,
    wherein the ink flow path has an ink circulation path, and the deaeration apparatus and the gear pump are provided in the ink circulation path.

7. The ink jet recording method of claim 5,
    the deaeration apparatus is located on the ink flow path upstream from the head and downstream from the gear pump.

8. The ink jet recording method of claim 1,
    wherein the ink composition for the ultraviolet ray curable inkjet recording further contains an acylphosphine oxide-based photopolymerization initiator.

9. The ink jet recording method of claim 1,
    further comprising heating the ink by a heating apparatus as the ink flows along the ink flow path.

10. The ink jet recording method of claim 1,
    the ink flow path has an ink circulation path, and the gear pump is provided in the ink circulation path.

* * * * *